(12) United States Patent
Deml et al.

(10) Patent No.: US 6,471,304 B1
(45) Date of Patent: Oct. 29, 2002

(54) BRAKE VALUE SIGNAL TRANSMITTER FOR AN ELECTRICALLY CONTROLLED AND ACTIVATED BRAKE SYSTEM

(75) Inventors: Ulrich Deml; Michael Döricht, both of Lappersdorf; Karl-Heinz Eglseder, Regensburg; Michael Huber, Eilsbrunn, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/212,550

(22) Filed: Dec. 16, 1998

Related U.S. Application Data

(63) Continuation of application No. PCT/DE98/01058, filed on Apr. 15, 1998.

(30) Foreign Application Priority Data

Apr. 16, 1997 (DE) .......................... 197 15 912

(51) Int. Cl.$^7$ .............................................. B60T 17/22
(52) U.S. Cl. .................... 303/113.4; 303/3; 303/15; 303/114.1
(58) Field of Search ....................... 303/3.15, 20, 114.1, 303/114.2, 114.3, 155, 113.4

(56) References Cited

U.S. PATENT DOCUMENTS 4,784,442 A * 11/1988 Petersen ...................... 303/15
4,919,493 A * 4/1990 Leiber ......................... 303/15
5,106,167 A * 4/1992 Matsuda ..................... 303/155
5,531,509 A * 7/1996 Kellner et al. ........... 303/114.1
5,563,355 A * 10/1996 Pluta et al. ................... 303/3
6,007,160 A * 12/1999 Lubbers et al. .......... 303/114.1

FOREIGN PATENT DOCUMENTS

| DE | 4324041 A1 | 1/1995 |
| DE | 4343314 A1 | 6/1995 |
| EP | 0768224 A1 | 4/1997 |
| EP | 0771705 A1 | 5/1997 |

OTHER PUBLICATIONS

"Potential elektronisch geregelte Bremssysteme", Ch. Wiehen et al., VDI Berichte, No. 1'88, 1995, pp. 119–139.
"Das Bremssystem EBS von Scania", ATZ Automobiltechnische Zeitschrift 98, 1996, pp. 406–407.

* cited by examiner

*Primary Examiner*—Matthew C. Graham
(74) *Attorney, Agent, or Firm*—Herbert L. Lerner; Laurence A. Greenberg; Werner H. Stemer

(57) ABSTRACT

A brake value signal transmitter that is to be connected to a brake pedal of a motor vehicle senses activations of the brake pedal with a plurality of sensors and converts them into electrical signals. The brake pedal is connected via a rotatably mounted pressure rod to a piston that can be displaced in the interior of a cylinder. A pressure space that is filled with a gas, has a variable volume, and can be filled at least partially with hydraulic oil is provided in the cylinder. The gas is compressed by the piston when the brake pedal is activated, and in the process increases a reaction force acting on the brake pedal.

8 Claims, 7 Drawing Sheets

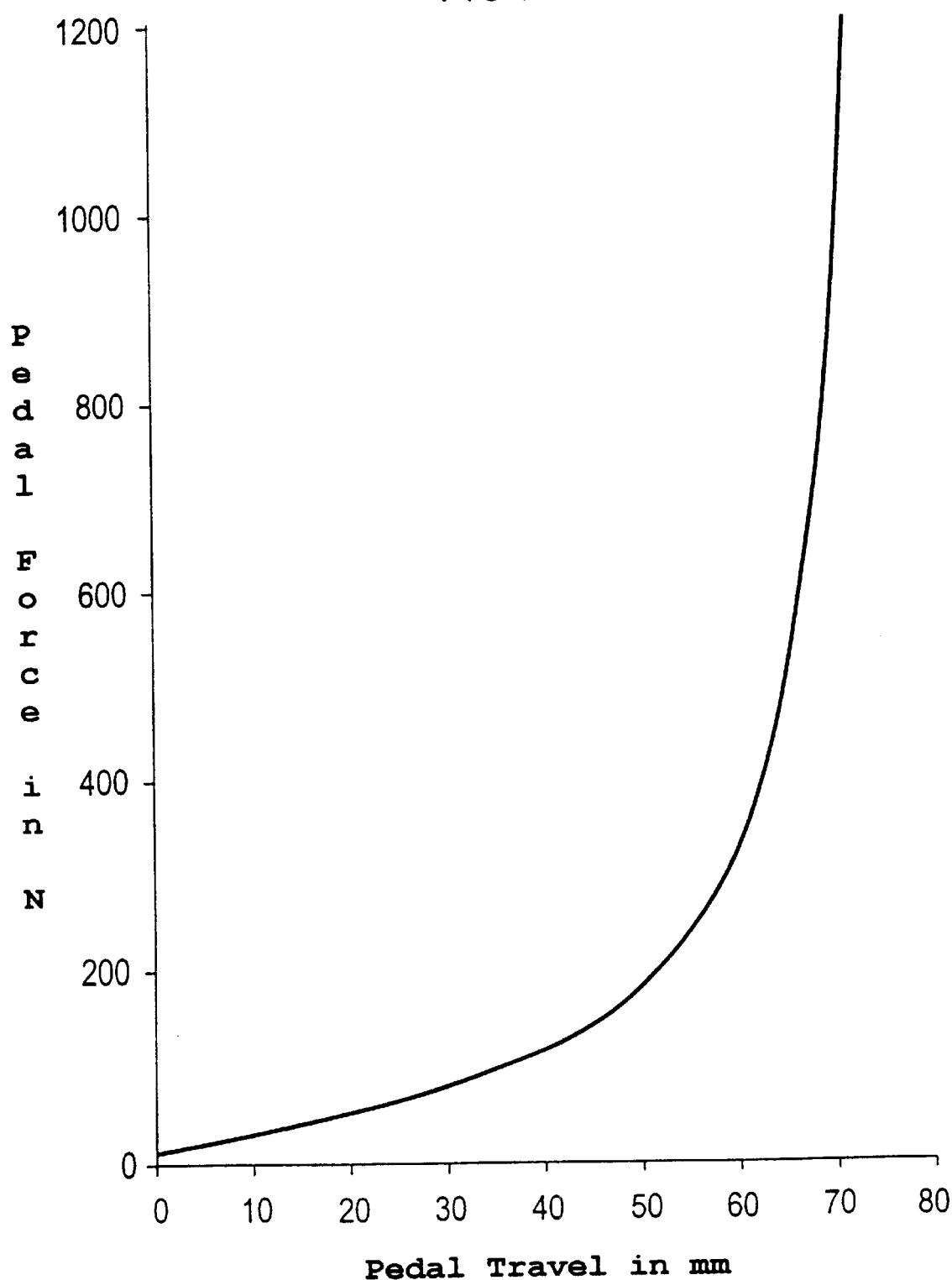

BRAKE VALUE SIGNAL TRANSMITTER FOR AN ELECTRICALLY CONTROLLED AND ACTIVATED BRAKE SYSTEM

CROSS-REFERENCE TO RELATED APPLICATION

This is a continuation of copending International Application PCT/DE98/01058, filed Apr. 15, 1998, which designated the United States.

BACKGROUND OF THE INVENTION

Field of the Invention

In servobrake systems for motor vehicles there is no mechanical, pneumatic or hydraulic connection between the activation unit, i.e. the brake pedal, and the wheel brakes, as is the case in conventional brake systems for motor vehicles. Although the driver can, by activating the brake pedal, influence the braking force by suitable control devices, his muscular force is not used, either in its entirety or in part, to generate the braking effect when the brake pedal is activated.

To date, servobrake systems have been used in vehicles on a series production basis only for utility vehicles, i.e. for trucks and buses. In such cases, compressed air or prestressed springs whose force is compensated in the released state by the force of a pneumatic cylinder on which compressed air acts are used as the operating energy. The braking effect is metered here by so-called service brake valves which are mechanically connected to the brake pedal and which, depending on the pedal position and pedal force, apply corresponding brake pressure to the wheel brake cylinders as taught in Bosch Technische Unterrichtung (Bosch Technical Education), Druckluftbremsanlagen, Geräte (Compressed Air Brake Systems, Equipment).

If the activation of the wheel brakes is controlled electronically as is known in the reference ATZ Automobiltechnische Zeitschrift (Motor Vehicle Technical Periodical) 98 (1996), pages 406 and 407; VDI Berichte (Reports) No. 1188, 1995, Potential Elektronisch Geregelter Bremssysteme (Potential of Electronically Controlled Brake Systems), the service brake valve is provided with sensors that measure the degree of deceleration desired by the driver. In the description of the concept for the electromechanical vehicle brake (also referred to as "brake by wire"), an electronic brake pedal with a sensor system which is implemented with redundancy and with which the wishes of the driver are sensed is mentioned. The desired deceleration that is sensed in this way is then transmitted to the braking and control unit in the form of electronic signals.

SUMMARY OF THE INVENTION

It is accordingly an object of the invention to provide a brake value signal transmitter for an electrically controlled and activated brake system which overcomes the above-mentioned disadvantages of the prior art devices of this general type, which makes it possible to meter the braking effect in a sensitive fashion. Furthermore, the intention is that the braking effect will be largely proportional to the activation force of the brake pedal.

With the foregoing and other objects in view there is provided, in accordance with the invention, in combination with an electrically controlled and activated brake system, a brake value signal transmitter to be connected to a brake pedal of a motor vehicle and sensing movements of the brake pedal with at least one sensor and converting the movements into electrical signals, the brake value signal transmitter including: a cylinder having an interior wall defining an interior formed therein; a piston disposed in the interior of the cylinder; a rotatably mounted pressure rod connecting the brake pedal to the piston; and the interior of the cylinder defining a pressure space filled with a gas and at least partially with a hydraulic oil, the hydraulic oil bounding a gas-filled part of the pressure space with a variable volume, and the gas being compressed by the piston when the brake pedal is activated and causing a reaction force acting on the brake pedal to increase.

The advantages of the invention are, inter alia, that the pedal value signal transmitter does not require mechanical, hydraulic or pneumatic power assistance. Electrical energy is required merely to operate the sensors. In addition, the pedal characteristic curve can be freely selected. Thus, it is, for example, possible given a servobrake system of identical configuration to set a somewhat more severe pedal characteristic curve, i.e. with relatively high activation forces for the same pedal travel, for a sporty vehicle than for a limousine where the emphasis is on comfort.

In accordance with an added feature of the invention, there is a return spring disposed in the interior of the cylinder pressing the piston into a starting position.

In accordance with another feature of the invention, there is a felt ring, the piston having a groove formed therein receiving the felt ring, and the interior wall defining the interior is wetted with the hydraulic oil by capillary action of the felt ring that is in contact with the hydraulic oil.

In accordance with an additional feature of the invention, there is a pressure sensor, the rotatably mounted pressure rod has a pressure rod cylinder hole formed therein full of hydraulic oil and a pressure rod piston projecting into the pressure rod cylinder hole filled with the hydraulic oil, the pressure rod cylinder hole is connected to the pressure sensor for sensing a pedal force acting on the pressure rod.

In accordance with a further added feature of the invention, the area between the piston and the interior wall defines the pressure space, and including a pressure sensor subjected to and measuring a gas pressure generated by the piston in the pressure space.

In accordance with a further additional feature of the invention, there is a force sensor connected to the pressure rod and measuring a force acting on the pressure rod when the brake pedal is activated.

In accordance with another added feature of the invention, there is a pressure vessel having a pressure space formed therein and filled with a hydraulic oil and a gas provided above the hydraulic oil, the interior of the cylinder is completely filled with the hydraulic oil and is connected to and fluidically communicates with the pressure space of the pressure vessel.

In accordance with another additional feature of the invention, the cylinder has a lid component with an interior closing off the cylinder, the piston having a stem with a given diameter guided in the interior of the cylinder, and the piston having an area with a relatively smaller diameter than the given diameter of the stem and guided in the interior of the lid component.

In accordance with a concomitant feature of the invention, an annular space surrounds the piston and an equalization space is defined outside of the piston, the stem having at least one throttle hole formed therein connecting the annular space surrounding the piston to the equalization space.

Other features which are considered as characteristic for the invention are set forth in the appended claims.

Although the invention is illustrated and described herein as embodied in a brake value signal transmitter for an electrically controlled and activated brake system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a graph of a characteristic curve of the brake value signal transmitters according to FIGS. 2 to 5.

DESCRIPTION OF THE PREFERRED EMBODIMENTS

Figure 1:
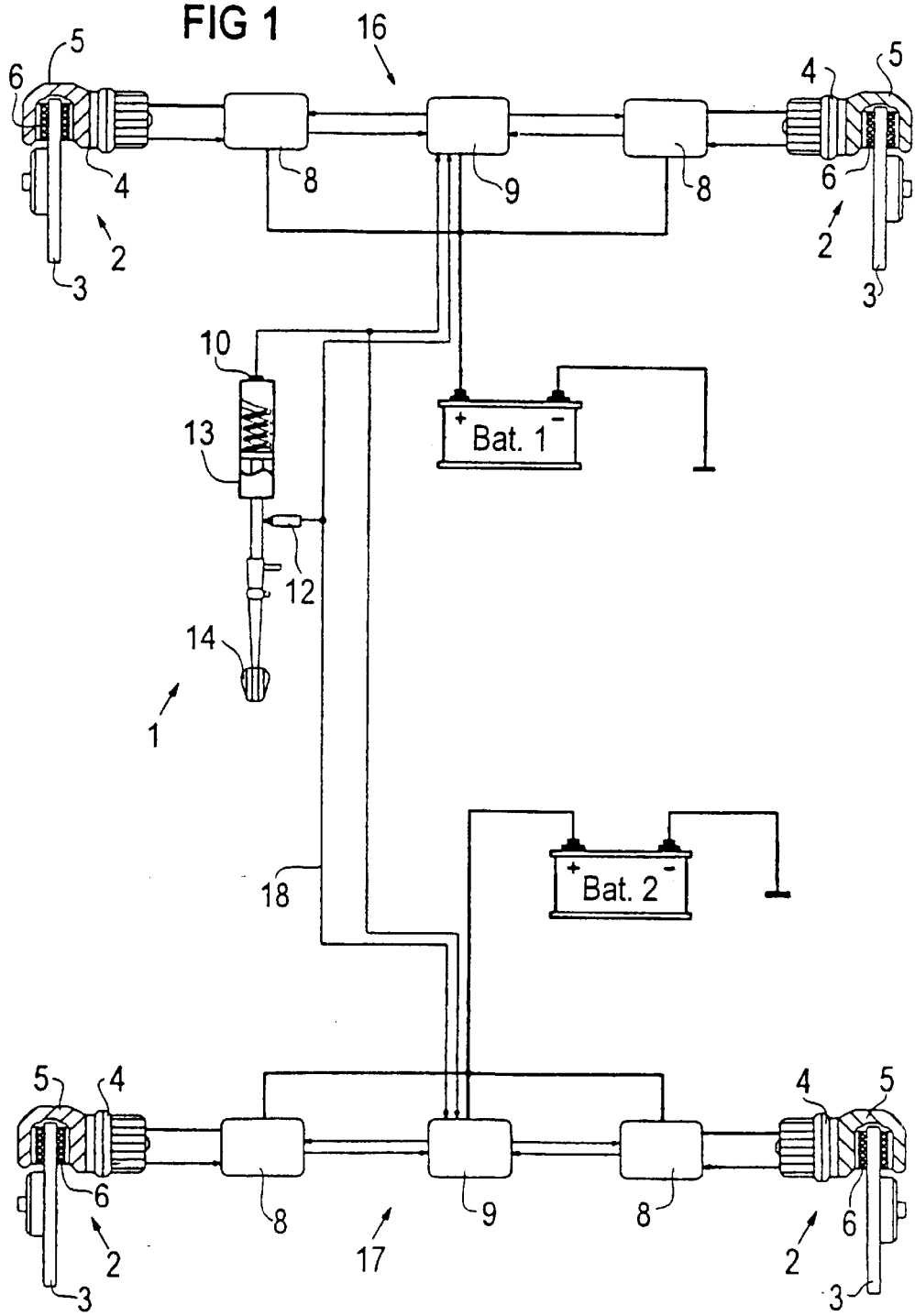
FIG. 1 is a diagrammatic view of an electrically controlled and activated brake system of a motor vehicle in which brake value signal transmitters are used according to the invention.

In all the figures of the drawing, sub-features and integral parts that correspond to one another bear the same reference symbol in each case. Referring now to the figures of the drawing in detail and first, particularly, to FIG. 1 thereof, there is shown a brake for a motor vehicle with four wheels (which vehicle is not illustrated in more detail here) containing four brakes 2 which each include a brake disk 3 and an activation device in the form of a wheel brake actuator 4. The wheel brake actuators 4 each have an integrated brake caliper 5, i.e. combined with it to form one physical unit. The brake caliper 5 is configured as a floating brake caliper. A brake torque is exerted on the brake disk 3 via brake linings 6 when the wheel brake actuator 4 is activated.

Each wheel brake actuator 4 has power and control electronics 8 which are supplied by an associated control unit 9 with control signals, for example for the setpoint force or setpoint pressure which is to be applied by the wheel brake actuator 4, and which supplies acknowledgment variables, for example relating to the actual value of the force, to the control unit 9.

The power and control electronics 8 also receive acknowledgment variables, for example relating to the pressing force with which the brake linings 6 are pressed against the brake disk 3 by a brake actuator 24 (FIG. 2) of the wheel brake actuator 4. The setpoint variables for each wheel brake actuator 4 are determined by the control unit 9 from measurement variables which are supplied by various sensors, for example a force sensor 10 and a travel sensor 12, with which a brake value signal transmitter or pedal force simulator 13, which is activated by the brake pedal 14 of the motor vehicle, is provided. The pedal force simulator 13 converts the movement of the brake pedal 14, i.e. the force exerted by the driver and the pedal travel into electrical signals which are fed to the control unit 9 and which constitute setpoint values for the brakes 2, in particular for the deceleration of the vehicle and the torque or brake torque which is to be applied to the brake disks 6. In order to calculate the setpoint values when anti-lock brake controllers or driving stability controllers intervene, further sensor signals, for example the lateral acceleration or the yaw angle rate and the wheel speeds, can be evaluated by the control unit 9.

The brake system 1 has two brake circuits 16 and 17 which are distributed between a front axle and a rear axle. A diagonal brake circuit distribution, which is equally possible, is distinguished from this only by a different assignment of the wheel brake actuators to the control units and power supplies. Each brake circuit 16, 17 has a separate control unit 9 and a separate power supply in the form of a battery Bat 1 and Bat 2, respectively. The power supplies and the control units can each be accommodated here in a housing, but must then be functionally separated from one another.

Supply lines are shown by thick lines in FIG. 1 and are not provided with arrows; control and signal lines are shown by thin lines and are provided with arrows corresponding to the direction of signal flow.

The two control units 9 which operate independently of one another can communicate with one another via a bi-directional signal line which can be seen in the drawing, and can thus detect the failure of the brake circuit 16 or 17 in the respective other brake circuit and, if appropriate, initiate suitable emergency measures. The brake system can also be supplemented with a non-illustrated third control unit that, as a supervisor, monitors the two brake circuit control units.

Figure 2:
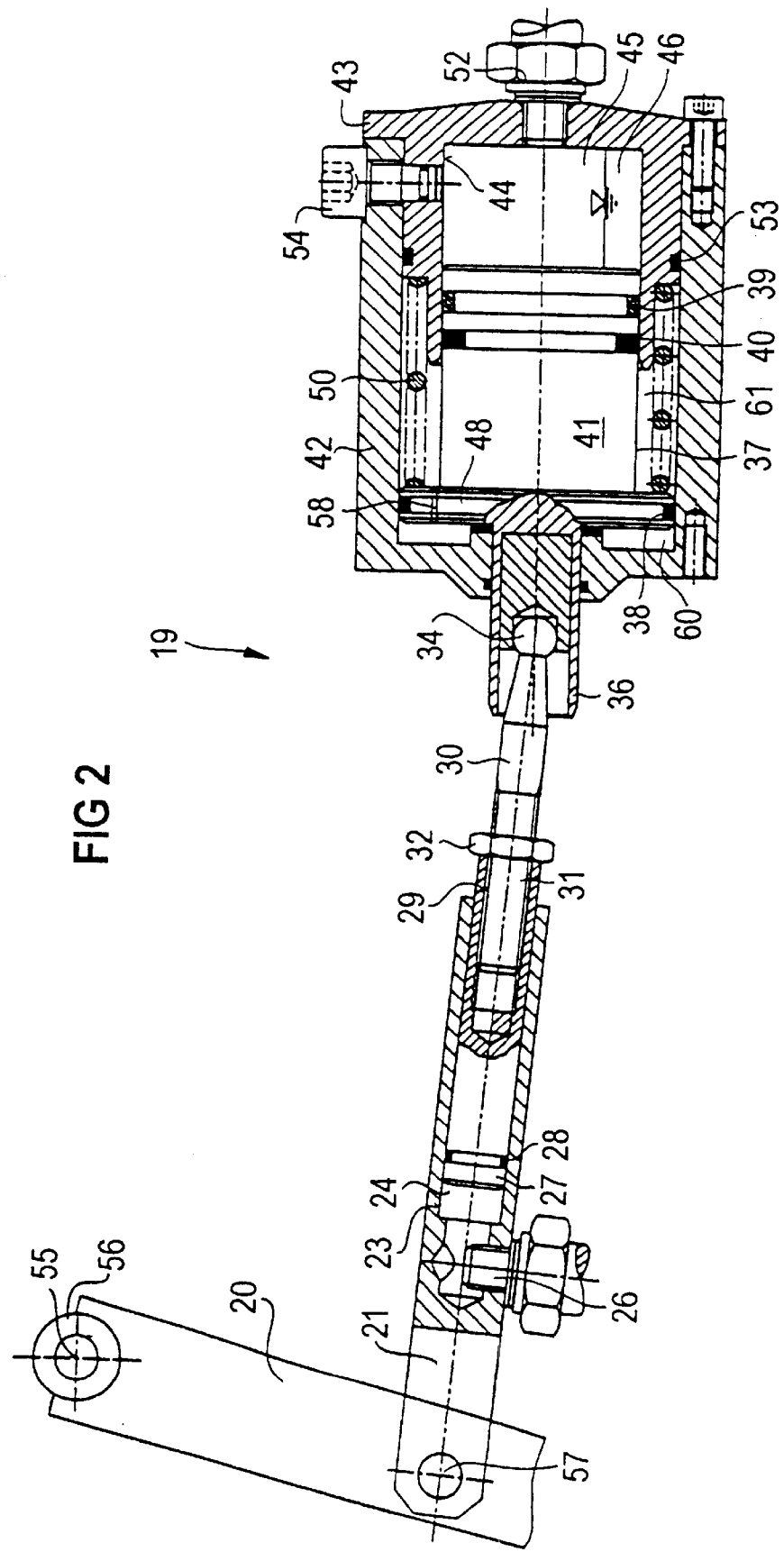
FIG. 2 is a sectional view of a first exemplary embodiment of a brake value signal transmitter.

A first exemplary embodiment of a brake value signal transmitter 19 according to the invention is connected to a brake pedal 20 by a rotatably mounted coupling fork 21 (FIG. 2). The latter has a cylindrical hole 23 whose one end is constructed as a pressure space 24. A first pressure sensor 26 is connected to the pressure space 24 via a lateral threaded hole. A pressure rod piston 27 is displaceably accommodated in the cylindrical hole 23. The pressure rod piston 27 is provided with a groove and a seal 28 which is contained therein and which prevents hydraulic fluid that is contained in the pressure space 24 from leaking out.

The other end of the pressure rod piston 27 has an internal thread 29 into which a pressure rod 30 is screwed with its end which is implemented as a threaded bolt 31 (on the left in the drawing). In order to prevent undesired loosening of this screwed connection, a securing nut 32 is provided, and the other end of the pressure rod 30 is configured as a spherical head 34 and is mounted in a hole of a steel bushing 36. This steel bushing 36 is pressed into a cylindrical hole of a piston 37 and is thus connected to the latter in a frictionally engaging fashion. The piston 37 has a shoulder or stem 48 (on the left in the drawing) with an annular groove which receives a pneumatic seal 38, preferably an O ring. At its other end, the piston 37 has two further annular grooves, the outer one of which receives a felt ring 39 and the inner one of which receives a second hydraulic seal 40. An area 41 (lying on the right in the drawing) of the piston 37 has a smaller diameter than the stem 48.

The piston 37 is displaceably guided with its stem 48 in the interior of a hollow cylinder 42 and with the area 41 in the interior of a lid component 43 that closes off the cylinder. The end face (lying on the right in the drawing) of the area 41 of the piston 37 and the cylindrical interior 44 of the lid component 43 form a variable pressure space 45 which is partially filled with a hydraulic oil 46 and with a gas or gas mixture, for example air, lying above it.

The felt ring 39 takes up hydraulic oil and also feeds it to the upper part of the wall of the cylindrical interior 44 through capillary action. As a result, sufficient wetting of the cylinder wall, and thus satisfactory functioning of the hydraulic seal 40, are always ensured.

A return spring 50 rests on the lid component 43 and its other end presses against the shoulder or stem 48 of the piston 37 and thus endeavors to push the piston 37 into its starting position. A second pressure sensor 52, which senses the pressure in the pressure space 45, is screwed into the lid component 43. The lid component 43 is sealed with respect to the interior of the cylinder 42 by a lid seal 53. The cylinder 42 and the lid component 43 are provided with a hole into which an oil filler cap 54 is screwed. Hydraulic oil can be introduced into the pressure space 45 and controlled by the hole that receives the oil filler cap 54. Instead of hydraulic oil, another suitable fluid that has lubricating properties may also be used.

A rotary angle sensor 56 that measures a rotary angle through which the brake pedal 20 passes when it is activated is mounted at a pivot point and bearing point 55 of the brake pedal 20. The pedal travel can be calculated from this using the pedal length.

When the brake pedal 20 is activated, the hydraulic oil that is contained in the pressure space 24 is compressed by the coupling fork 21. Because of the low compressibility of the hydraulic oil and the small filling volume in the pressure space 24, only a very small amount of travel, which cannot be sensed at the brake pedal 20 by the driver, is required for the compression. From the pressure in the pressure space 24 it is possible to calculate the force exerted on the pressure rod 30, it being possible to ignore the frictional force between the wall of the cylindrical hole 23 and the pressure rod piston 27. This force is transmitted to the piston 37 via the spherical head 34 and the steel bushing 36, and it moves the piston 37 into the pressure space 45 of the cylinder 42 counter to the force of the return spring 50.

The air enclosed in the pressure space 45 is compressed until the force which is thus built up exerts on the piston 37 a reaction force which is equal to the force in the pressure rod 30 minus the force of the return spring and the frictional forces. This force can be calculated from the measurement signal of the second pressure sensor 52. The pressure in the pressure space 45 increases exponentially with the piston travel. This results in a highly progressive pedal characteristic curve. By changing the quantity of the hydraulic oil 46, which is virtually incompressible in comparison with the air, the volume of gas in the volume in the pressure space 45 can be changed and the travel of the pressure characteristic curve can thus be influenced.

The response force of the brake value signal transmitter 19 is determined by the prestress of the return spring 50 and can thus also be changed.

A further possible way of changing the characteristic curve of the brake value signal transmitter is obtained by making one or more throttle holes 58 in the stem 48 of the piston 37. The throttle holes 58 constitute a pneumatic connection between an equalization space 60, which is located between the left-hand end wall of the stem 48 and the interior of the cylinder 42, and an annular space 61 in which the return spring 50 is disposed. The throttle holes 58 reduce or prevent a pressure build-up, which would bring about an additional return force, in the annular space 61. A further advantage of the throttle holes 58 is that they can be used to set the damping of the piston movement in a selective fashion.

Figure 3:
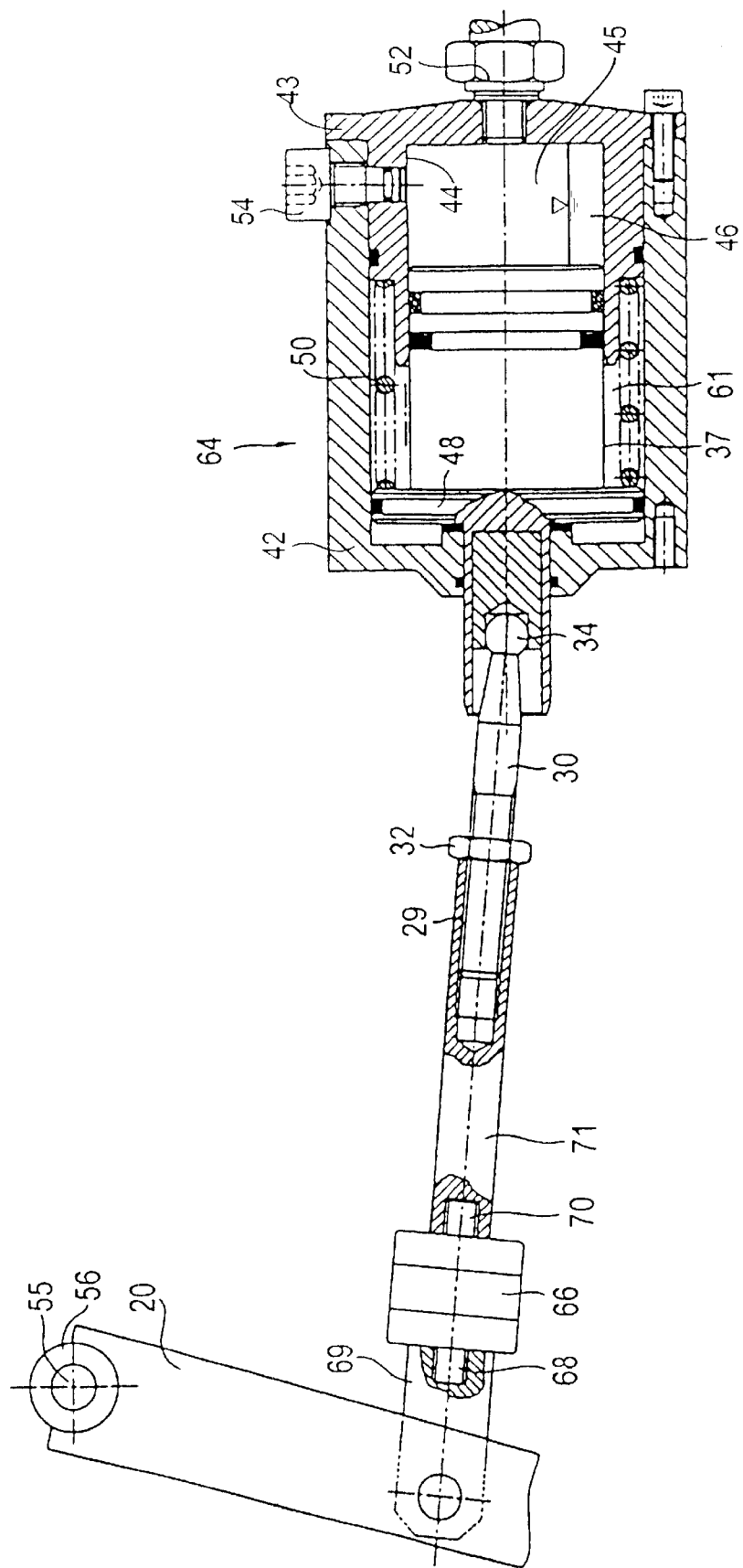
FIG. 3 is a sectional view of a second exemplary embodiment of the brake value signal transmitter.

In a second exemplary embodiment of a brake value signal transmitter 64 according to the invention (FIG. 3), the force which occurs in the pressure rod 30 is not sensed with a pressure sensor but rather with a force sensor 66. The latter has a first threaded pin 68, which is screwed into the coupling fork 69, and a second threaded pin 70, which is screwed to a guide rod 71. The force sensor 66 senses the force occurring in the guide rod 71 and converts it into an electrical signal. In addition, it mechanically connects the coupling fork 69 to the guide rod 71. This embodiment has the advantage that it is possible to dispense with a pressure space, a pressure rod piston and hydraulic fluid in the pressure rod and the expenditure on components can thus be reduced. The further components of the brake value signal transmitter 64 correspond precisely to those of the brake value signal transmitter 19 in FIG. 2.

Figure 4:
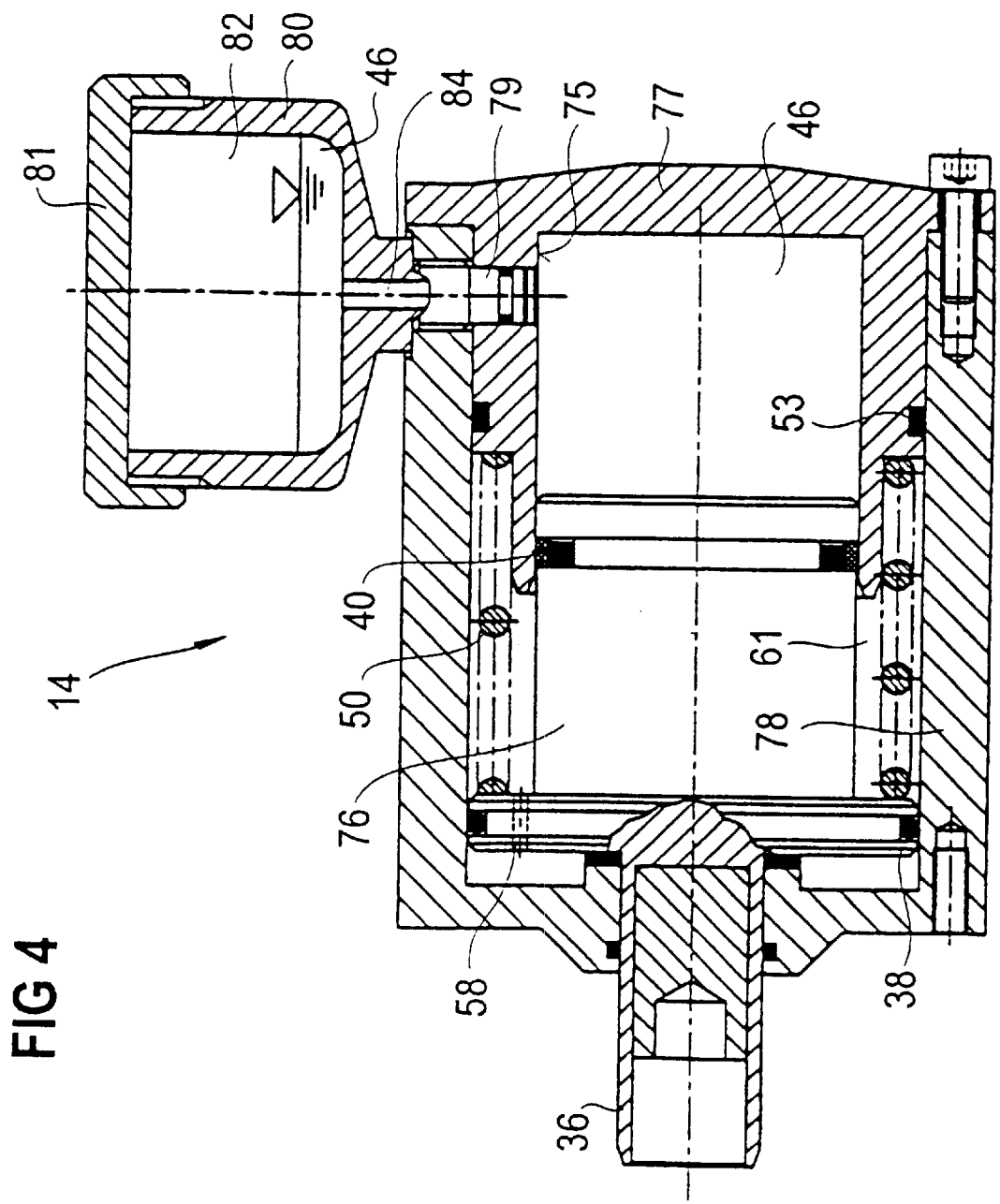
FIG. 4 is a sectional view of a pressure cylinder of the brake value signal transmitter.

In a further exemplary embodiment of the invention, the pressure cylinder differs from the pressure cylinder 42 described above. An interior 75 (FIG. 4), which is formed by a piston 76 and an inner wall of a lid component 77 of a cylinder housing 78, is completely filled with hydraulic oil 46 in order to better wet the cylindrical interior. The interior 75 is connected to an interior of a pressure vessel 80 via a hole 79. The vessel 80 is filled only partially with hydraulic oil, and therefore also contains gas or gas mixtures, for example air, and forms a pressure space 82 which is closed off by a closure 81.

If the piston 76 is moved to the right by a force acting on the steel bushing 36, the hydraulic oil 46 flows out of the interior 75 into the pressure vessel 80 and essentially only compresses the air in the pressure space 82 there, since the compressibility of the hydraulic oil is, as mentioned, significantly lower than that of air. As a result, the force/travel characteristic curve according to the invention is also obtained here. The damping of the brake value signal transmitter can be set by the cross section of a flow hole 84 between the threaded hole 79 and the pressure space 82.

Figure 5:
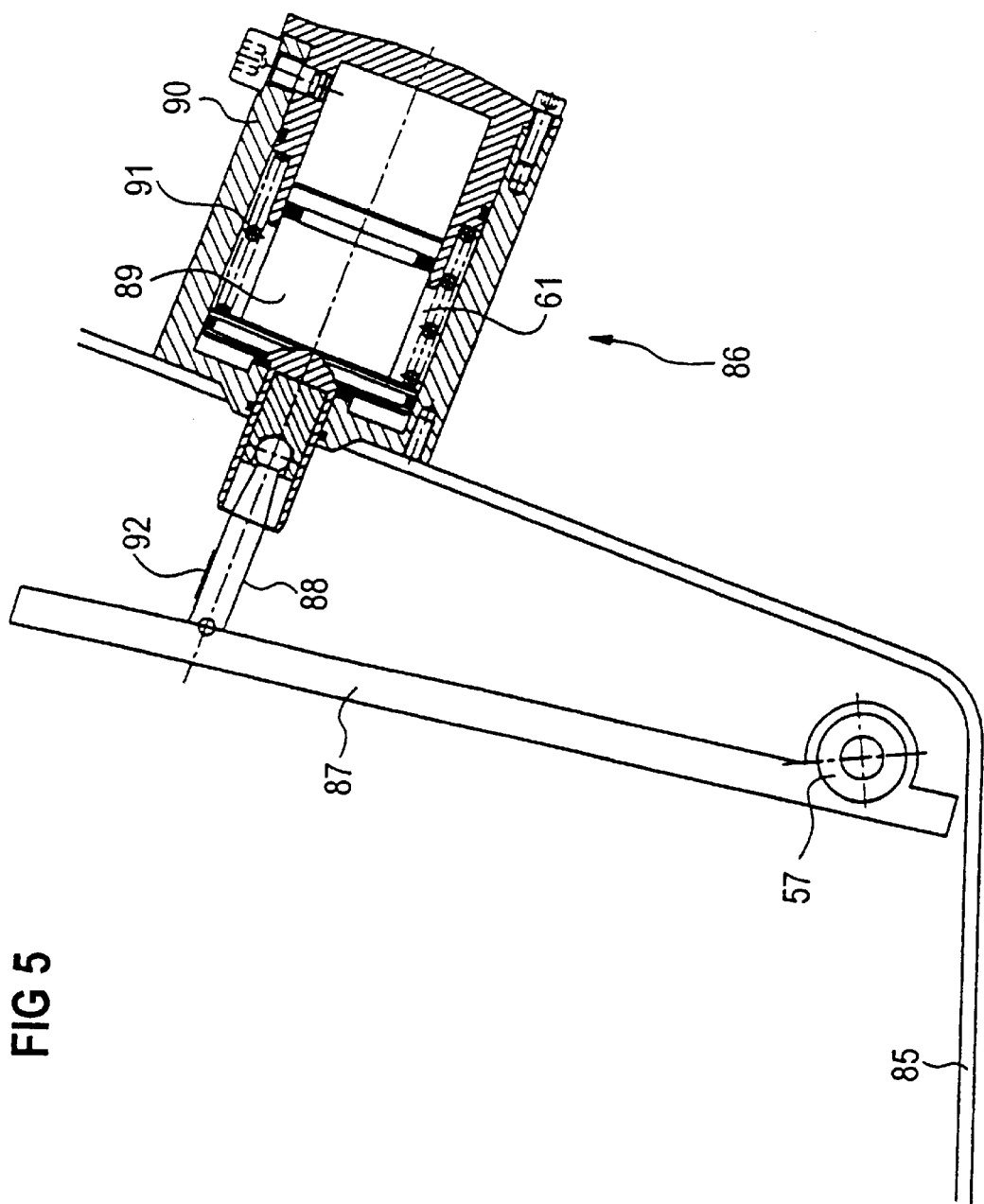
FIG. 5 is a sectional view of a different exemplary embodiment of the brake value signal transmitter having a floor-mounted brake pedal.

A further exemplary embodiment of a brake value signal transmitter 86 according to the invention (FIG. 5) is provided for a brake pedal 87 which is floor-mounted, i.e. rotatably mounted at its lower end. The brake value signal transmitter 86 is, like the exemplary embodiments described until now, attached to a floor plate 85 of the motor vehicle. A pressure rod 88 is shorter than in the previously described embodiments. Because of the smaller lever transmission ratio here, the forces acting on a piston 89 in a pressure cylinder 90 are lower so that a return spring 91 may be of a weaker construction. The dimensions of the pressure cylinder 90 and of the piston 89 are also lower, which has favorable effects on the installation space and the weight of the brake value signal transmitter 86.

As a result of the smaller dimensions of the brake value signal transmitter 86, the latter no longer projects so far into the engine cavity, as a result of which there is a smaller risk of injury in the case of an accident with a head-on impact, since the pedal can no longer penetrate so far into the passenger compartment. A force sensor 92 is configured here as a strain gauge which is bonded onto the pressure rod 88. This also reduces the expenditure on the measurement of force. In order to measure the travel, either the rotary angle sensor 57 is used or a linear potentiometer (not illustrated in the drawing) is inserted between the brake pedal 87 and the brake value signal transmitter 86.

Figure 6:
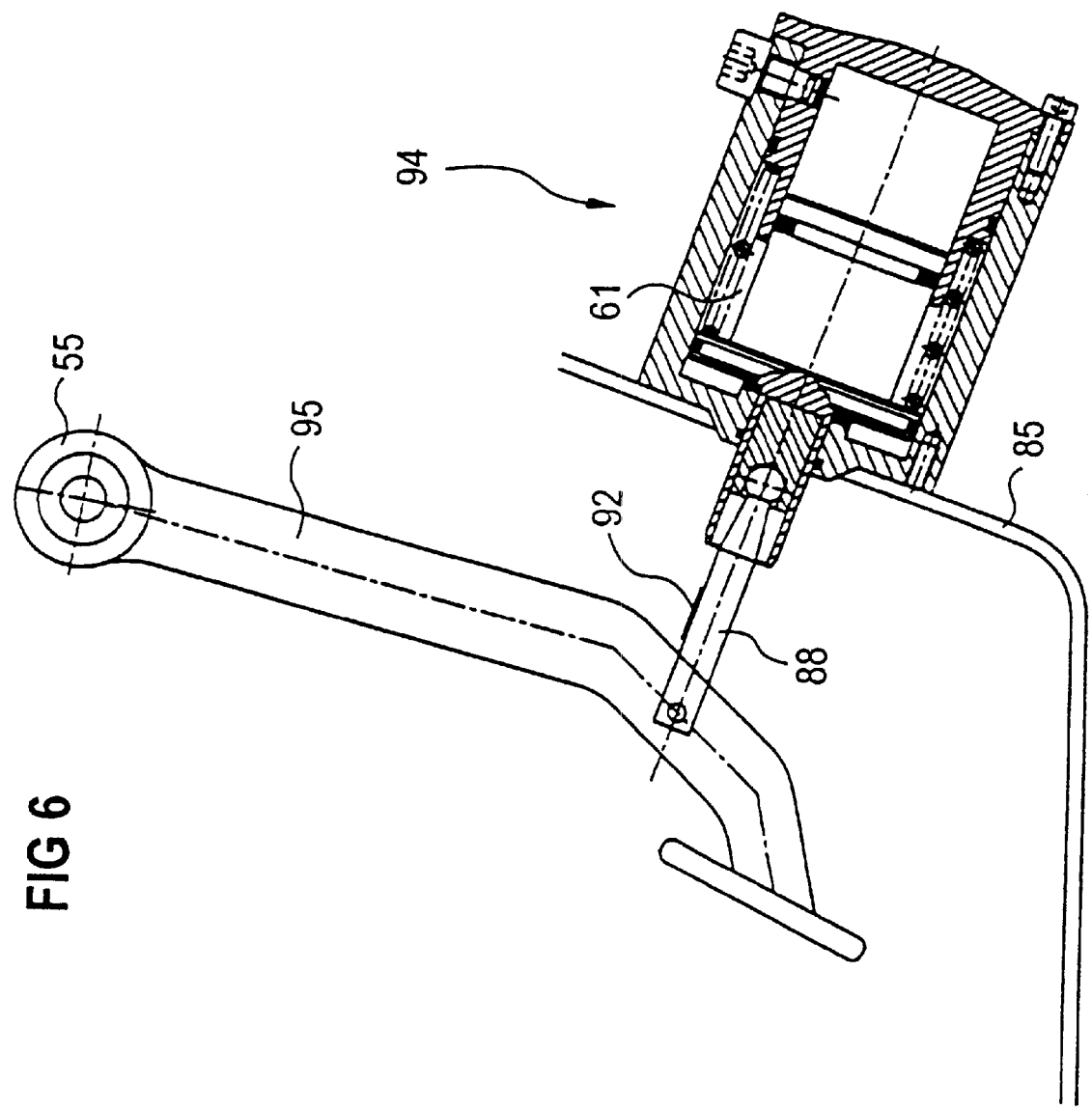
FIG. 6 is a sectional view of a further exemplary embodiment of the brake value signal transmitter having a suspended brake pedal.

A further exemplary embodiment of a brake value signal transmitter 94 (FIG. 6) is provided for a brake pedal 95 which is suspended, i.e. rotatably mounted at its upper end, and it corresponds otherwise in its construction and its method of operation to the brake value signal transmitter 86 described above.

FIG. 7 shows a typical characteristic curve of a brake value signal transmitter according to the invention. The curve represents the pedal force (in N) acting on the brake pedal, as a function of the pedal travel (in mm). The strong increase in the pedal force with increasing travel, which is referred to as progressive force/travel characteristic curve is characteristic. Such a characteristic curve is very advantageous since it makes it possible to operate the brake system of a motor vehicle in a very suitable way. In the case of braking operations with low deceleration, i.e. in the case of normal braking operations, the pedal, which at the beginning is relatively "soft" over a sufficiently long pedal travel, permits very sensitive metering of the braking effect. In the case of an emergency braking operation, the pedal is quickly pressed to the floor by the driver's foot with a large amount of force. In order to keep the reaction time short, the pedal travel should require as little time as possible in such a case. The soft zone with low pedal force is quickly passed through and the pedal force then rises strongly with very little travel required.

Ideally, the brake value signal transmitter is adjusted in such a way that the maximum pedal force which is to be applied by a normal driver occurs during the ergonomically most favorable pedal travel. Since there is no mechanical connection to the actual brake system here, the sensation of the pedal can be determined freely independently of the construction of the brake system and the type of motor vehicle. The adjustment of the pedal characteristic curve is made here by way of the prestress and the stiffness of the return spring, the diameter and the length of the pressure space and the quantity of oil filled into the pressure space. The damping of the brake pedal can be set by throttle holes in the piston shoulder or by a flow hole in the pressure vessel. By using gas, i.e. air, as the compression medium it is possible to implement a progressive characteristic curve that makes it possible to apply relatively large forces. If the application of the same forces were to be made possible by a progressive spring, a considerable expenditure in terms of physical space and weight for a suitable spring structure would be necessary.

The filling of the various cylinders with hydraulic oil ensures a very good sealing effect, and thus a long service life. A brake value signal transmitter according to the invention is a maintenance-free component over the entire service life of the motor vehicle. The fact that three sensors are used in the brake value signal transmitter results in a very high level of operational reliability. In the described exemplary embodiments, two pressure or force sensors and one travel sensor are used, but it is also possible to use a combination of two travel sensors and one pressure or force sensor. If one sensor fails, the defective sensor can be identified with the other two sensors without any doubt.

Since, with the exception of the sensors, only mechanical components are used and in addition, apart from a very low requirement of electrical energy, no further energy is required to supply the sensors in order to operate the brake value signal transmitter, the brake value signal transmitter has a very high level of reliability and accuracy. The measurement of the pedal travel and of the pedal force that is possible in different ways gives rise to room for maneuvering the way in which the desired deceleration is determined. For example, the travel signal can preferably be weighted in the soft area of the pedal characteristic curve owing to its better resolution, while the force signal can be given greater weighting in the case of high pedal forces, since the travel resolution is not so high here. In particular, a strict proportionality between the deceleration of the vehicle and the pedal activation force can be achieved. Furthermore, selective acknowledgment can be provided, for example an increase in the necessary pedal force when a high degree of brake fading occurs. In this case, an intentional deviation is made from the proportionality between the pedal force and the deceleration of the vehicle in order to signal to the driver that there is the risk of overloading the brakes if he does not change his driving style.

In further examples of the brake value signal transmitter according to the invention, the annular space 61 which is filled with air or gas, between the piston 37 and the outer cylinder 42 (see FIGS. 2 to 6) forms a pressure space whose contents are compressed when the brake pedal is activated, and in the process increases the reaction force acting on the brake pedal. The pressure space 45 can be dispensed with here and the return spring is not necessary in all cases. As a result, the structure of the brake value signal transmitters 19, 64, 74, 86 and 94 is simplified appreciably.

The magnitude of the reaction force can be set by defining the volume of the annular space 61, and the influence of the reaction force on the activation of the brakes can also be adapted to the respective requirements by selecting the lever transmission ratio of the brake pedal 20 or 95.

We claim:

1. In combination with an electrically controlled and activated brake system, a brake value signal transmitter to be connected to a brake pedal of a motor vehicle and sensing movements of the brake pedal with at least one sensor and converting the movements into electrical signals, the brake value signal transmitter comprising:

a cylinder having an interior wall defining an interior formed therein;

a piston disposed in said interior of said cylinder;

a rotatably mounted pressure rod connecting the brake pedal to said piston; and said interior of said cylinder defining a pressure space filled with a gas and at least partially with a hydraulic oil, the hydraulic oil bounding a gas-filled part of said pressure space with a variable volume, and the gas being compressed by said piston when the brake pedal is activated and causing a reaction force to act on the brake pedal.

2. The brake value signal transmitter according to claim 1, including a return spring disposed in said interior of said cylinder pressing said piston into a starting position.

3. The brake value signal transmitter according to claim 1, including a felt ring, said piston having a groove formed therein receiving said felt ring, and said interior wall defining said interior is wetted with the hydraulic oil by capillary action of said felt ring that is in contact with the hydraulic oil.

4. The brake value signal transmitter according to claim 1, including a force sensor connected to said pressure rod and measuring a force acting on said pressure rod when the brake pedal is activated.

5. The brake value signal transmitter according to claim 1, wherein said cylinder has a lid component with an interior closing off said cylinder, said piston having a stem with a given diameter guided in said interior of said cylinder, and said piston having an area with a relatively smaller diameter than said given diameter of said stem and guided in said interior of said lid component.

6. The brake value signal transmitter according to claim 5, wherein an annular space surrounds said piston and an equalization space is defined outside of said piston, said stem having at least one throttle hole formed therein connecting said annular space surrounding said piston to said equalization space.

7. In combination with an electrically controlled and activated brake system, a brake value signal transmitter to be connected to a brake pedal of a motor vehicle and sensing movements of the brake pedal with at least one sensor and converting the movements into electrical signals, the brake value signal transmitter comprising:

a cylinder having an interior wall defining an interior formed therein;

a piston disposed in said interior of said cylinder;

a rotatably mounted pressure rod connecting the brake pedal to said piston; and said interior of said cylinder at least partially defining a pressure space filled with a gas and at least partially with a hydraulic oil, the hydraulic oil bounding a gas-filled part of said pressure space with a variable volume, and the gas being compressed by said piston when the brake pedal is activated and causing a reaction force to act on the brake pedal.

8. The brake value signal transmitter according to claim 7, including a pressure vessel having an interior formed therein that communicates with said interior of said cylinder, said interior of said pressure vessel and said interior of said cylinder together defining said pressure space.

* * * * *